United States Patent [19]
Kulak et al.

[11] 3,736,735
[45] June 5, 1973

[54] MECHANISM FOR RETAINING THE WING SECTION OF AN IMPLEMENT IN ITS RAISED POSITION

[75] Inventors: John Kulak, Port Colborne, Ontario; Kenneth Lawrence Kirkpatrick, Welland, Ontario, both of Canada

[73] Assignee: Deere & Company, Moline, Ill.

[22] Filed: July 14, 1971

[21] Appl. No.: 162,429

[52] U.S. Cl. ...................... 56/13.6, 56/6, 56/385
[51] Int. Cl. ............................................ A01d 55/28
[58] Field of Search .................... 56/11.3, 15.2, 16.6, 56/6, 13.6, 385, DIG. 9; 292/144, 201; 16/49, 51; 172/452, 456

[56] References Cited
UNITED STATES PATENTS

| | | | |
|---|---|---|---|
| 3,176,452 | 4/1965 | Wathen et al. | 56/11.3 |
| 2,682,740 | 7/1954 | Miller et al. | 56/13.6 |
| 3,400,521 | 9/1968 | Caldwell | 56/6 |

*Primary Examiner*—Antonio F. Guida
*Attorney*—H. Vincent Harsha, Harold M. Knoth, William A. Murray et al.

[57] ABSTRACT

A mechanism for retaining the wing section of an agricultural implement in its raised, transport position, the wing section being hingedly secured to a main frame section and movable between raised and lowered positions by means of an extensible and retractable hydraulic cylinder. The mechanism includes a link member mounted at one end on a pin pivotally connecting the anchor end of the cylinder to the main frame section, the link having an apertured opposite end biased to automatically engage a pin connecting the rod end of the cylinder to the wing section when the latter is moved into its raised position. A manually-operated lock mechanism is provided to lock the apertured end of the link out of engagement with the pin, thereby permitting the wing section to return to its lowered position.

16 Claims, 6 Drawing Figures

INVENTORS
JOHN KULAK
KENNETH L. KIRKPATRICK

BY John O. Hayes
ATTORNEY

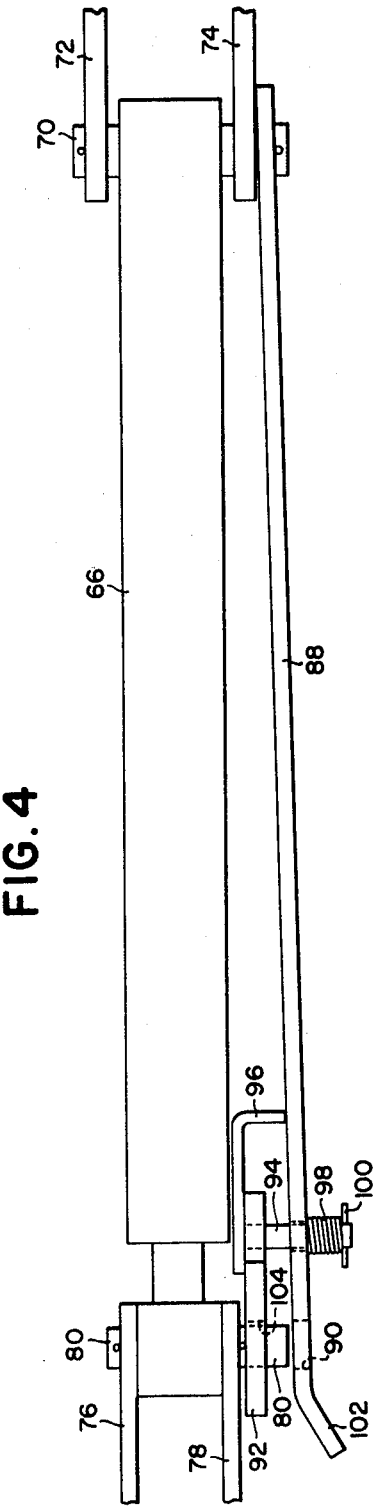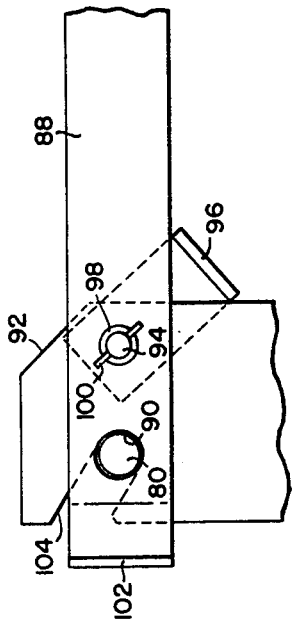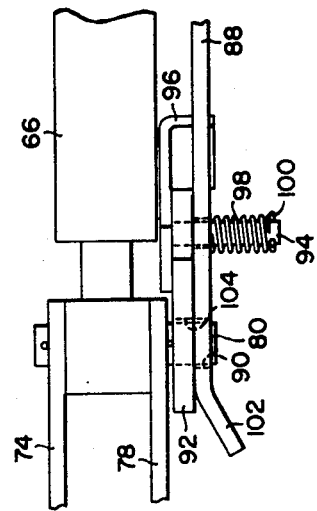

MECHANISM FOR RETAINING THE WING SECTION OF AN IMPLEMENT IN ITS RAISED POSITION

BACKGOUND OF THE INVENTION

The present invention relates generally to implements having a wing or outrigger section secured to a main frame section for movement between raised and lowered positions, and more particularly to a semi-automatic device for retaining such a wing section in its raised position.

It is conventional in the design and construction of extremely wide agricultural implements to hingedly mount one or more wing or outrigger frame sections on a main frame section for movement between raised and lowered positions, thereby enabling the implement to convert from a substantial operating width to a relatively narrow transport width. In those cases in which a hydraulic cylinder is employed to raise and lower the wing sections, it is desirable to include provision for independently locking the sections in their raised positions, thereby avoiding the possibility of the sections falling should the hydraulic system experience a sudden loss of pressure. It is further desirable that such an apparatus require minimum additional structure and operator effort.

SUMMARY OF THE INVENTION

Accordingly, the primary object of the present invention is the provision of mechanism for retaining an implement outrigger section in its raised, transport position, the mechanism requiring a minimum amount of additional structure, thereby maintaining its cost at a low level, while at the same time requiring minimal manual effort on the part of the operator.

The invention comprises, generally, a link member mounted at one end on the pin connecting the anchor end of the hydraulic lift cylinder to the main frame section and apertured at its opposite end to receive the pin connecting the rod end of the cylinder to the wing section. By utilizing the pre-existing hydraulic cylinder mounting pins as anchor points for the link, the apparatus requires no additional bracing members or mounting brackets on the implement sections.

The apertured end of the link member is mounted on the main frame section for movement toward and away from its pin-engaging position, and a spring mechanism acting between the link and main frame section urges the link toward this position. As the wing section is raised into its transport position, an outer end of the pin connecting the rod end of the cylinder to the wing section contacts an angled end portion of the link, forcing the link away from its pin-engaging position. When the wing section reaches its fully-raised position, the cylinder pin on the wing is aligned with the aperture on the end of the link, and the spring mechanism thus urges the link into locking engagement with the pin. The retaining mechanism includes a manually-operable device for locking the link out of its pin-engaging position against the biasing force of the spring, thereby releasing the section from its raised position and permitting it to return to the operating position.

BRIEF DESCRIPTION OF THE DRAWINGS

The preferred embodiment of the present invention will be described in conjunction with the accompanying drawings, in which:

FIG. 4 is an enlarged plan view of the retaining mechanism in its locked-out-of-engagement position;

FIG. 5 is a fragmentary plan view similar to FIG. 4, though showing the mechanism in its engaged position; and FIG. 6 is a rear elevation view of the mechanism shown in FIG. 5.

DESCRIPTION OF THE PREFERRED EMBODIMENT

Figure 1:
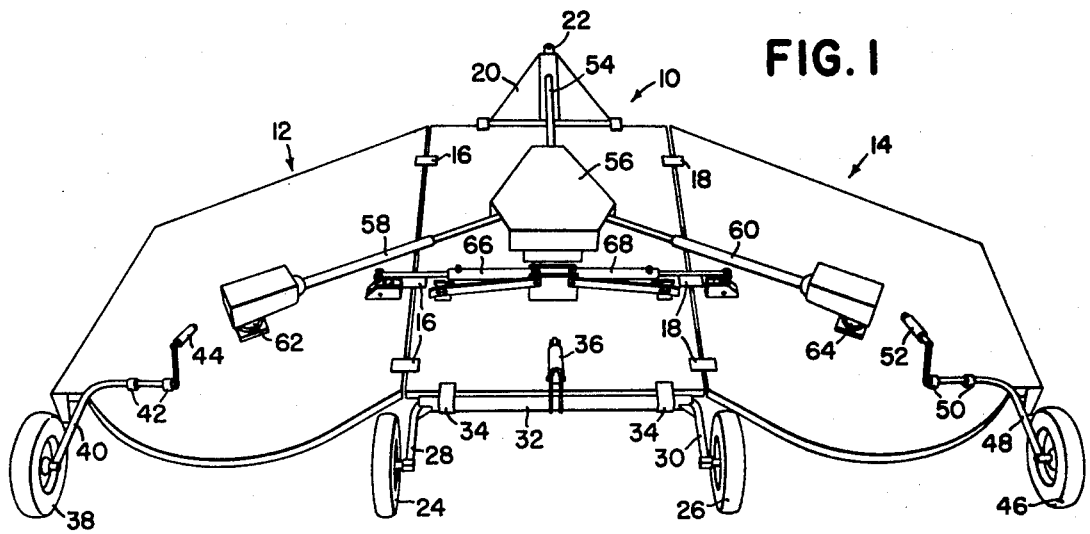
FIG. 1 is a rear perspective view of a three-section flexible mower incorporating the wing-retaining mechanism of the invention.

Referring first to FIG. 1, the wing retaining mechanism is illustrated as embodied in a three-section, flexible mower comprising a center or main frame section 10 and a pair of left and right wing or outrigger frame sections 12 and 14, respectively. Three hinges 16 mount the left wing section 12 to the center section 10 for swinging movement between a substantially horizontal, lowered operating position as shown in FIG. 1, and a substantially vertical, raised transport position as shown fragmentarily in FIG. 3. The same number of hinges 18 mount the right wing section 14 to the center section 10 for movement between its raised and lowered positions. A triangular hitch structure 20 converges forwardly from the leading edge of the section 10 and is provided with a clevis 22 at its forward end adapted for attachment to the drawbar of a tractor. The section 10 is supported at its rear by a pair of wheels 24 and 26 rotatably carried on the ends of arms 28 and 30, respectively, the arms being fixed to and extending rearwardly from a transverse rockshaft 32. The shaft 32 is rockably supported on the section 10 in bearing members 34 and is rotatable by means of a hydraulic cylinder 36 to raise and lower the section 10 relative to the ground. The wing section 12 is supported at its outer rear corner by a wheel 38 rotatably carried on the end of an arm 40 which, in turn, is supported in bearings 42 and is rockable by means of a hydraulic cylinder 44 to raise and lower the section 12 relative to the ground. In a similar manner, the section 14 is supported at its outer rear corner by a wheel 46 rotatably carried on the end of an arm 48 which, in turn, is supported in bearings 50 and is rockable by means of a hydraulic cylinder 52 to raise and lower the section 14 relative to the ground. Although not shown in the drawings, hydraulic lines connect the cylinders 36, 44, and 52 with the hydraulic system on the tractor in such a manner that the sections 10, 12, and 14 may be raised and lowered simultaneously.

Beneath each of the sections 10, 12, and 14 is a mower blade (not shown) mounted for rotation in a horizontal plane. The blades are driven from the power take-off shaft on the tractor through drive transmission means including a longitudinal shaft 54 interconnecting the power take-off shaft with a gearbox on the center of the section 10, the gearbox being obscured in FIG. 1 by a hexagonal shield 56, and a pair of rearwardly diverging telescopic shafts 58 and 60 interconnecting output shafts on the center gearbox with input shafts on gearboxes 62 and 64, mounted centrally on the wing sections 12 and 14, respectively. Each of the gearboxes has a vertical output shaft mounting a mower blade on its lower end.

Figure 2:
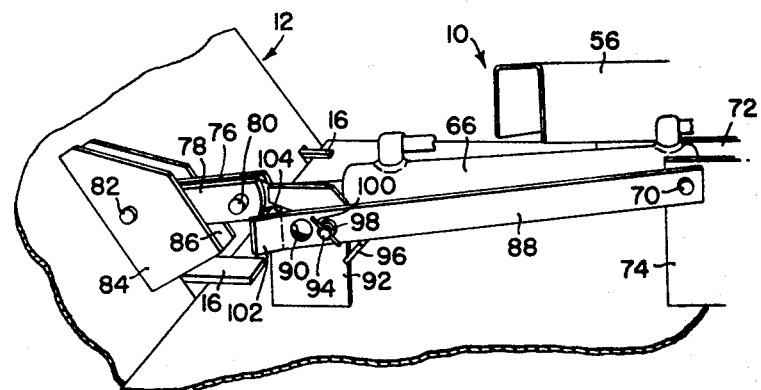
FIG. 2 is an enlarged, fragmentary perspective view of the retaining mechanism with the wing section of the mower positioned between its raised and lowered positions.

The wing sections 12 and 14 are raised and lowered relative to the center section 10 by means of transversely aligned hydraulic cylinders 66 and 68. As is apparent from FIG. 1, the mechanism provided for raising and lowering the left wing section 12 is an exact mirror image of the mechanism provided for raising and lowereing the right wing section 14, and in the ensuing description reference will thus be made only to the former mechanism, illustrated in detail in FIGS. 2-6, it being understood that the description applies analogously to the latter mechanism as well. As shown in FIGS. 2 and 4, the inner or anchor end of the cylinder 66 is pivotally mounted on a pin 70 extending longitudinally between the corners of fore-and-aft spaced support plates 72 and 74, respectively, the plates 72 and 74 being rigidly fixed to the section 10. The outer or rod end of the cylinder is received between the upper ends of a pair of parallel arms 76 and 78 and is pivotally mounted therein on a longitudinal pin 80. The lower ends of the arms 76 and 78 are pivotally connected at 82 to a bracket 84 which, in turn, is rigidly fixed to the wing section 12.

When the wing section 12 is in its operating position, the cylinder 66 is extended as shown in FIG. 1. As the section 12 pivots about its hinged connection with the section 10 to conform to lateral variations in the ground level, the cylinder 66 is maintained at a fixed length, and relative pivotal movement thus takes place at the pins 70, 80, and 82. To limit the downward movement of the wing section 12 relative to the center section 10, and thus prevent the drive shaft 58 from interfering with the right longitudinal edge of the section 12, the bracket 84 on the section 12 is provided with a stop block 86 which engages the inner edges of the arms 76 and 78 when the section 12 reaches the desired limit of its downward movement, and thus prevents further downward movement of the section. During initial retraction of the cylinder 66, no movement of the wing section takes place until the arms 76 and 78 contact the block 86, and, as shown in FIG. 2, the arms 76 and 78 remain in contact with the block 86 through the initial raising of the section. As the wing section approaches its raised position, however, the arms 76 and 78, due to the changing line of pull, move away from the block 86. In the fully-raised position shown in FIG. 3, the inner or lower edge of the bracket 84 contacts the surface of the center section 10 to prevent further movement of the section 12.

According to the present invention, the wing section 12 is retained in its fully-raised position independently of the cylinder 66 by means of a rigid link member 88 mounted at one end on the rear end portion of the pin 70 and extending transversely outwardly alonside and substantially parallel with the cylinder 66. The outer end of the link is apertured at 90 to receive the rear end portion of the pin 80 when the section 12 is in the fully-raised position. When disposed in its locking position, the link 88 rigidly interconnects the pins 70 and 80, thereby preventing extension of the cylinder 66 and thus downward movement of the section 12.

The apertured end of the link 88 is mounted on an upstanding plate 92 fixed to the surface of the section 10, for longitudinal movement toward and away from its pin-engaging position. A pin 94 extends rearwardly through the plate 92 and slidably receives the link 88. Fixed to the forward end of the pin 94 is an L-shaped member 96 which, as will presently appear, serves to lock the link 88 out of its pin-engaging position. A coil spring 98 is received on that portion of the pin 94 which extends rearwardly from the link 88, and acts between the rear surface of the link and a retaining pin 100 on the end of the pin 94 to bias the link toward its pin-engaging position. The L-shaped member 96 is swingable between a substantially horizontal position, in which, as shown in FIG. 4, the rear edge of the longitudinal leg of the member engages the front side of the link 88 and holds it away from its pin-engaging position against the biasing force of the spring 98, and a downwardly and inwardly extending position, in which, as shown in FIGS. 5 and 6, the longitudinal leg of the member extends rearwardly between the plate 92 and link 88. In the latter position of the member 96, the link 88 is positioned to engage the pin 80 when the section 12 assumes its fully-raised position.

Figure 3:
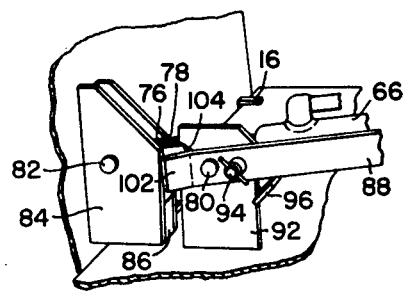
FIG. 3 is a fragmentary rear perspective view of the mechanism, similar to FIG. 2, though showing the wing section of the mower locked in its fully raised position.

As the section 12 approaches its fully-raised position, the rear end portion of the pin 80 engages an angled outer end portion 102 of the link 88 which forces the link rearwardly away from its pin-engaging position. When the section 12 reaches its fully-raised position, the pin 80 will be aligned with the aperture 90 in the link 88, and the spring 98 will urge the link into its pin-engaging position as shown in FIGS. 3, 5, and 6, thereby locking the wing section in its transport position. To lower the section 12 back to its operating position, the member 96 muct be manually moved to its horizontal position of FIG. 4, in which position the member 96 holds the link away from its pin-engaging position and thus releases the section 12. To ensure that the pin 80 will come into proper alignment with the aperture 90 in the link 88 when the section 12 is raised, the plate 92 is provided with a slot or guide 104 for guiding the pin into the required position.

The complete operation of the wing retaining mechanism will now be described. In preparation for raising the wing sections of the implement from their operating to their transport position, the operator, as a safety measure, must first disconnect the forward ends of the drive shafts 58 and 60 from the gearbox on the section 10 and secure the shafts on suitable hangers (not shown) on the respective wing sections. The L-shaped member 96 must then be moved from its horizontal position to its downwardly and inwardly extending position, thereby permitting the link 88 to assume its pin-engaging position. The cylinder 66 is then retracted, which swings the section 12 upwardly to its transport position. As the section 12 approaches its fully-raised position, the pin 80 engages the angled portion 102 of the link 88, thereby forcing the link away from its pin-engaging position. When the pin 80 comes into alignment with the aperture 90 of the link 88, the latter snaps into its engaging position under the biasing force of the spring 98, thereby locking the section 12 in its transport position. To lower the section 12 back to its operating position, the operator must move the L-shaped member 96 back to its horizontal position, thereby releasing the link 88 from engagement with the pin 80, and extend the cylinder 66. Finally, the drive shafts 58 and 60 must be reconnected to the respective output shafts of the gearbox on the section 10.

We claim:

1. In combination with an implement having a first section, a second section pivotally connected to the first section for movement between lowered and raised positions, an extensible and retractable hydraulic cylinder interconnecting said first and second sections and operable to move said second section between its lowered and raised positions, first pin means pivotally mounting one end of the hydraulic cylinder on the first section, and second pin means pivotally mounting the other end of the hydraulic cylinder on the second section, means for releasably retaining the second section in its raised position comprising: a link member mounted at one end on said first pin means and having pin-engaging means on its other end engageable with said second pin means when the second section is in its raised position.

2. The invention defined in claim 1 including means biasing said pin-engaging means into engagement with said second pin means when the second section is in its raised position.

3. The invention defined in claim 2 including means for selectively locking said pin-engaging means out of engagement with said second pin means.

4. The invention defined in claim 2 wherein said biasing means comprises support means on said first implement section, means mounting said link on said support means for movement of said pin-engaging means toward and away from a pin-engaging position, and spring means acting between said support means and said link member for biasing said pin-engaging means towards its pin-engaging position.

5. The invention defined in claim 4 including means on said second implement section engageable with said link as said second section is moved toward its raised position and operable to move said pin-engaging means away from its pin-engaging position.

6. The invention defined in claim 5 wherein said second pin means is engageable with said link as said second section is moved toward its raised position and operable to move said pin-engaging means away from its pin-engaging position.

7. The invention defined in claim 6 wherein said pin-engaging means comprises an aperture in said link adapted to receive said second pin means.

8. The invention defined in claim 4 including means on said support means for selectively locking said pin-engaging means out of its pin-engaging position.

9. The invention defined in claim 4 including guide means on said support means for guiding said second pin means into position to engage said pin-engaging means as said second implement section is moved toward its raised position.

10. The invention defined in claim 1 further characterized by a link member support on the first implement section adjacent said other end, said link member is connected to the support to yield axially with respect to the second pin means and has an outer end portion projecting toward the second section beyond the pin-engaging means and its connection to the support, said end portion being angled axially with respect to the second pin means and engageable with the latter as the second section moves from its lowered to its raised position.

11. The invention defined in claim 10 in which the pin-engaging means is a hole in said link member that receives the end of the second pin and the end of the second pin engages the outer end portion of the link as the second section is raised to thereby force the link axially outwardly to permit entry of the end into the hole.

12. The invention defined in claim 11 further characterized by an adjustable member movably supported on the support and manually adjustable for insertion between the link member and support to hold the link member and its pin-engaging means out of engagement with the second pin means.

13. In combination with an implement having a first section, a second section pivotally connected to the first section for movement between lowered and raised positions, an extensible and retractable hydraulic cylinder interconnecting said first and second sections and operable to move said second section between its lowered and raised positions, first pin means pivotally mounting one end of the hydraulic cylinder on the first section, and second pin means pivotally mounting the other end of the hydraulic cylinder on the second section, means for releasably retaining the second section in its raised position comprising: a link member mounted at one end on said first section and having pin-engaging means on its other end engageable with said second pin means when the second section is in its raised position, a link member support on said first section adjacent the other end of said link member, said link member being connected to the support to yield axially with respect to the second pin means and having an outer end portion projecting toward the second section beyond the pin-engaging means and its connection to the support, said end portion being angled axially with respect to the second pin means and engageable with the latter as the second section moves from its lowered to its raised position.

14. The invention defined in claim 13 wherein said link member is mounted at one end on said first pin means.

15. The invention defined in claim 13 in which the pin-engaging means is a hole in said link member that receives the end of the second pin and the end of the second pin engages the outer end portion of the link as the second section is raised to thereby force the link axially outwardly to permit entry of the end into the hole.

16. The invention defined in claim 15 further characterized by an adjustable member movably supported on the support and manually adjustable for insertion between the link member and support to hold the link member and its pin-engaging means out of engagement with the second pin means.

* * * * *